US011273751B2

(12) United States Patent
Johnson

(10) Patent No.: US 11,273,751 B2
(45) Date of Patent: Mar. 15, 2022

(54) AUXILIARY LIGHT FOR MOUNTING TO A VEHICLE

(71) Applicant: Bestop Baja, LLC, San Marcos, CA (US)

(72) Inventor: Christopher Johnson, San Marcos, CA (US)

(73) Assignee: Bestop Baja, LLC, San Marcos, CA (US)

( * ) Notice: Subject to any disclaimer, the term of this patent is extended or adjusted under 35 U.S.C. 154(b) by 239 days.

(21) Appl. No.: 16/596,742

(22) Filed: Oct. 8, 2019

(65) Prior Publication Data

US 2021/0101521 A1    Apr. 8, 2021

(51) Int. Cl.
| | |
|---|---|
| *B60Q 1/04* | (2006.01) |
| *F21S 45/48* | (2018.01) |
| *B60Q 1/18* | (2006.01) |
| *F21S 41/141* | (2018.01) |

(52) U.S. Cl.
CPC ............ *B60Q 1/0483* (2013.01); *B60Q 1/18* (2013.01); *F21S 45/48* (2018.01); *F21S 41/141* (2018.01)

(58) Field of Classification Search
CPC ......... B60Q 1/0483; B60Q 1/18; F21S 45/48; F21S 41/141
USPC .................................................... 362/249.02
See application file for complete search history.

(56) References Cited

U.S. PATENT DOCUMENTS

| | | | |
|---|---|---|---|
| 3,586,270 A | 6/1971 | Loffler et al. | |
| 3,691,366 A | 9/1972 | Spreuer | |
| 3,949,218 A | 4/1976 | Hayward | |
| 4,074,124 A | 2/1978 | Maute et al. | |
| D248,691 S | 7/1978 | Cibie | |

(Continued)

FOREIGN PATENT DOCUMENTS

| | | |
|---|---|---|
| CN | 101592301 | 12/2009 |
| CN | 102095172 | 6/2011 |

(Continued)

OTHER PUBLICATIONS

"Baja Designs LP9 8" 105W/21W Round LED Light." Found online Jul. 30, 2019 at www.carid.com. Product reviewed Apr. 23, 2018. Retrieved from URL: https://www.carid.com/baja-designs/baja-designs-off-road-lights-6697- 72111.html#reviews (Year: 2018).

(Continued)

*Primary Examiner* — Rajarshi Chakraborty
*Assistant Examiner* — Hana S Featherly
(74) *Attorney, Agent, or Firm* — Lowe Graham Jones PLLC

(57) ABSTRACT

An apparatus includes an auxiliary light includes a housing defining a front opening, a light emitting in the housing, and a transparent cover is mounted over the front opening. A plurality of fins are mounted to the housing and extend rearwardly from the front opening. The heights of the plurality of fins in the vertical direction decreases with distance from the front opening along the horizontal direction. This may include downward sloping outer fins and inner fins having bottom edges that include concave arcs extending upwardly. A mount secures to the housing and includes a base with a fastener overlapping a center of gravity of the light and arms that extend up to pivot points on the housing that are offset behind the center of gravity.

17 Claims, 4 Drawing Sheets

(56) References Cited

U.S. PATENT DOCUMENTS

| | | |
|---|---|---|
| 4,167,783 A | 9/1979 | Mitchell |
| 4,220,981 A | 9/1980 | Koether |
| D259,516 S | 6/1981 | Catte |
| D261,051 S | 9/1981 | Catte |
| 4,319,311 A | 3/1982 | Mitchell |
| D266,599 S | 10/1982 | Suzuki |
| 4,357,651 A | 11/1982 | Mayer |
| D274,000 S | 5/1984 | Bailly |
| 4,636,922 A | 1/1987 | Takimoto et al. |
| 4,722,031 A | 1/1988 | Matsuyama et al. |
| 4,742,436 A | 5/1988 | Hoggett |
| D304,380 S | 10/1989 | Bailly |
| D304,621 S | 11/1989 | Schmidt |
| D304,622 S | 11/1989 | Schmidt |
| D304,861 S | 11/1989 | Schmidt |
| 5,103,382 A | 4/1992 | Kondo et al. |
| 5,103,385 A | 4/1992 | Federico et al. |
| 5,107,406 A | 4/1992 | Sekido et al. |
| 5,132,885 A | 7/1992 | Hocheim et al. |
| 5,171,083 A | 12/1992 | Rich |
| 5,611,510 A | 3/1997 | Yamamoto |
| D383,227 S | 9/1997 | Nagano |
| D385,982 S | 11/1997 | Moore |
| D393,086 S | 3/1998 | Nagano |
| 6,079,852 A | 6/2000 | Kamaya et al. |
| 6,135,625 A | 10/2000 | Kodaira et al. |
| 6,186,649 B1 | 2/2001 | Zou et al. |
| 6,428,197 B1 | 8/2002 | Downing |
| D490,172 S | 5/2004 | Yamamoto |
| 6,764,206 B1 | 7/2004 | Felty |
| 6,773,148 B2 | 8/2004 | Kasboske |
| 6,783,266 B2 | 8/2004 | McCoy et al. |
| D495,814 S | 9/2004 | James |
| D513,599 S | 1/2006 | Coward |
| D514,973 S | 2/2006 | Coward |
| D520,656 S | 5/2006 | Shiu |
| D526,430 S | 8/2006 | Hernandez et al. |
| D530,029 S | 10/2006 | Neufeglise et al. |
| D576,754 S | 9/2008 | Wang |
| D578,681 S | 10/2008 | Huang |
| 7,556,396 B2 | 7/2009 | Kuo et al. |
| D625,452 S | 10/2010 | Kamada |
| D634,871 S | 3/2011 | Wooh |
| D640,819 S | 6/2011 | Pan |
| D642,302 S | 7/2011 | Schiavone et al. |
| 7,972,035 B2 | 7/2011 | Boyer |
| D643,951 S | 8/2011 | Cai |
| 8,021,024 B2 | 9/2011 | Huang |
| 8,066,404 B2 | 11/2011 | Song |
| 8,083,366 B1 | 12/2011 | Backer |
| D653,783 S | 2/2012 | Biro et al. |
| 8,330,362 B2 | 12/2012 | Lin |
| D676,990 S | 2/2013 | Adams |
| D688,399 S | 8/2013 | Adams |
| D689,232 S | 9/2013 | Velazquez |
| D694,928 S | 12/2013 | Chen |
| D700,385 S | 2/2014 | Quadri |
| D702,866 S | 4/2014 | Blincoe et al. |
| 8,714,792 B2 | 5/2014 | Adams |
| D712,077 S | 8/2014 | Leban et al. |
| 8,827,518 B2 | 9/2014 | Smith et al. |
| D725,806 S | 3/2015 | Yakushi |
| D729,677 S | 5/2015 | Aho |
| D735,908 S | 8/2015 | Ko |
| D737,482 S | 8/2015 | Kuge |
| D740,473 S | 10/2015 | Chen |
| D747,516 S | 1/2016 | Yang |
| D748,831 S | 2/2016 | Fan |
| D749,253 S | 2/2016 | Marroquin |
| D754,891 S | 4/2016 | Leban et al. |
| D762,315 S | 7/2016 | Lin |
| 9,403,476 B2 | 8/2016 | Hausler et al. |
| D766,473 S | 9/2016 | Riedel et al. |
| D766,499 S | 9/2016 | Packard et al. |
| 9,452,707 B1 | 9/2016 | Tsai |
| D768,896 S | 10/2016 | Smith |
| D788,334 S | 5/2017 | Jacq et al. |
| 9,739,462 B2 | 8/2017 | Georgitsis |
| D799,080 S | 10/2017 | Dennis et al. |
| 9,800,017 B1 | 10/2017 | Raring et al. |
| D802,197 S | 11/2017 | Ding et al. |
| 9,829,182 B1 | 11/2017 | McCaslin et al. |
| D806,299 S | 12/2017 | Gebhard et al. |
| 9,835,296 B2 | 12/2017 | Goutain et al. |
| D815,318 S | 4/2018 | LaMarche et al. |
| 10,050,415 B1 | 8/2018 | Raring et al. |
| D827,883 S | 9/2018 | Deyaf et al. |
| 10,084,281 B1 | 9/2018 | Raring et al. |
| 10,197,227 B2 | 2/2019 | Williamson et al. |
| D845,532 S | 4/2019 | Zhu |
| D849,293 S | 5/2019 | Ko |
| 10,309,592 B2 | 6/2019 | Roach et al. |
| D854,206 S | 7/2019 | Yang |
| 2002/0036908 A1 | 3/2002 | Pederson |
| 2002/0085390 A1 | 7/2002 | Kiyomoto et al. |
| 2004/0037088 A1* | 2/2004 | English ........... F21S 43/195 362/545 |
| 2004/0085779 A1 | 5/2004 | Pond et al. |
| 2004/0223342 A1 | 11/2004 | Klipstein et al. |
| 2005/0128768 A1 | 6/2005 | Martineau |
| 2006/0126325 A1 | 6/2006 | Lefebvre et al. |
| 2006/0262544 A1 | 11/2006 | Piepgras et al. |
| 2008/0285271 A1 | 11/2008 | Roberge et al. |
| 2010/0171606 A1 | 7/2010 | Law et al. |
| 2010/0204841 A1 | 8/2010 | Chemel et al. |
| 2010/0254148 A1 | 10/2010 | Huang |
| 2010/0309664 A1 | 12/2010 | Liu |
| 2010/0328945 A1 | 12/2010 | Song |
| 2011/0002120 A1 | 1/2011 | Song |
| 2011/0141723 A1 | 6/2011 | Lai et al. |
| 2011/0182065 A1 | 7/2011 | Negley et al. |
| 2011/0211330 A1 | 9/2011 | Wang |
| 2012/0099326 A1 | 4/2012 | Hammond et al. |
| 2012/0106152 A1 | 5/2012 | Zheng |
| 2012/0218757 A1 | 8/2012 | Gill |
| 2013/0155688 A1 | 6/2013 | LaVigna et al. |
| 2013/0235583 A1 | 9/2013 | Chang |
| 2013/0271977 A1 | 10/2013 | Ronen |
| 2013/0278139 A1 | 10/2013 | Sievers et al. |
| 2013/0329413 A1 | 12/2013 | Cotta, Sr. et al. |
| 2014/0063811 A1 | 3/2014 | Yun |
| 2014/0078762 A1 | 3/2014 | Adams |
| 2014/0146544 A1 | 5/2014 | Gebhard |
| 2014/0192545 A1 | 7/2014 | Law et al. |
| 2014/0301101 A1 | 10/2014 | Russ |
| 2014/0317916 A1 | 10/2014 | Clifford |
| 2015/0285472 A1 | 10/2015 | Evitt |
| 2015/0316238 A1 | 11/2015 | Guilmette |
| 2015/0323147 A1 | 11/2015 | Kanayama et al. |
| 2017/0030566 A1 | 2/2017 | Milam |
| 2017/0184271 A1 | 6/2017 | Norris et al. |
| 2017/0297480 A1 | 10/2017 | Elwell et al. |
| 2017/0313244 A1 | 11/2017 | Luciew |
| 2017/0327027 A1 | 11/2017 | Takaya et al. |
| 2018/0022268 A1 | 1/2018 | Xie |
| 2018/0080616 A1 | 3/2018 | Elwell et al. |
| 2018/0202622 A1 | 7/2018 | Arce |
| 2019/0093851 A1 | 3/2019 | Johnson et al. |

FOREIGN PATENT DOCUMENTS

| | | |
|---|---|---|
| CN | 202708679 U | 1/2013 |
| CN | 203940377 U | 11/2014 |
| CN | 104641173 | 5/2015 |
| CN | 205118860 U | 3/2016 |
| CN | 105650568 | 6/2016 |
| JP | 2012-22807 | 2/2012 |
| KR | 10-1251079 | 3/2013 |
| KR | 10-2015-0128313 | 11/2015 |
| KR | 10-1707890 | 2/2017 |
| TW | D161541 | 7/2014 |

(56) References Cited

FOREIGN PATENT DOCUMENTS

| TW | D175903 | 5/2016 |
|---|---|---|
| TW | D188091 | 1/2018 |

OTHER PUBLICATIONS

"BajaDesigns LP9 LED Driving/Combo Light." Found online Jul. 30, 2019 at www.amazon.com. Product first available Nov. 8, 2017. Retrieved from URL: https://www.amazon.com/BajaDesigns-LP9-Driving-Combo-Light/dp/B0778XHKDW (Year: 2017).

"Machine Tool Design Manual", Oct. 31, 1997, Compile Group of Machine Tool Design Manual, pp. 548-549.

"Practical Cold Extrusion Technology", Dec. 31, 2005, Jin Rengang, pp. 1-4.

"Side Shooter LED Pods, AAIWA." Found online Jul. 30, 2019 at www.amazon.com. Product first available Apr. 18, 2019. Retrieved from URL: https://tinyurl.com/y6gto6fp (Year: 2019).

Taiwan IPO Search Report for Taiwan Design Patent Application No. 107302183, Completed Aug. 27, 2018.

"YouTube—The LP9 from Baja Designs." Found online Jul. 30, 2019 at www.youtube.com. Video published Aug. 29, 2017. Retrieved from URL: https://www.youtube.com/watch?v=2NSPgpvC3yc (Year: 2017).

\* cited by examiner

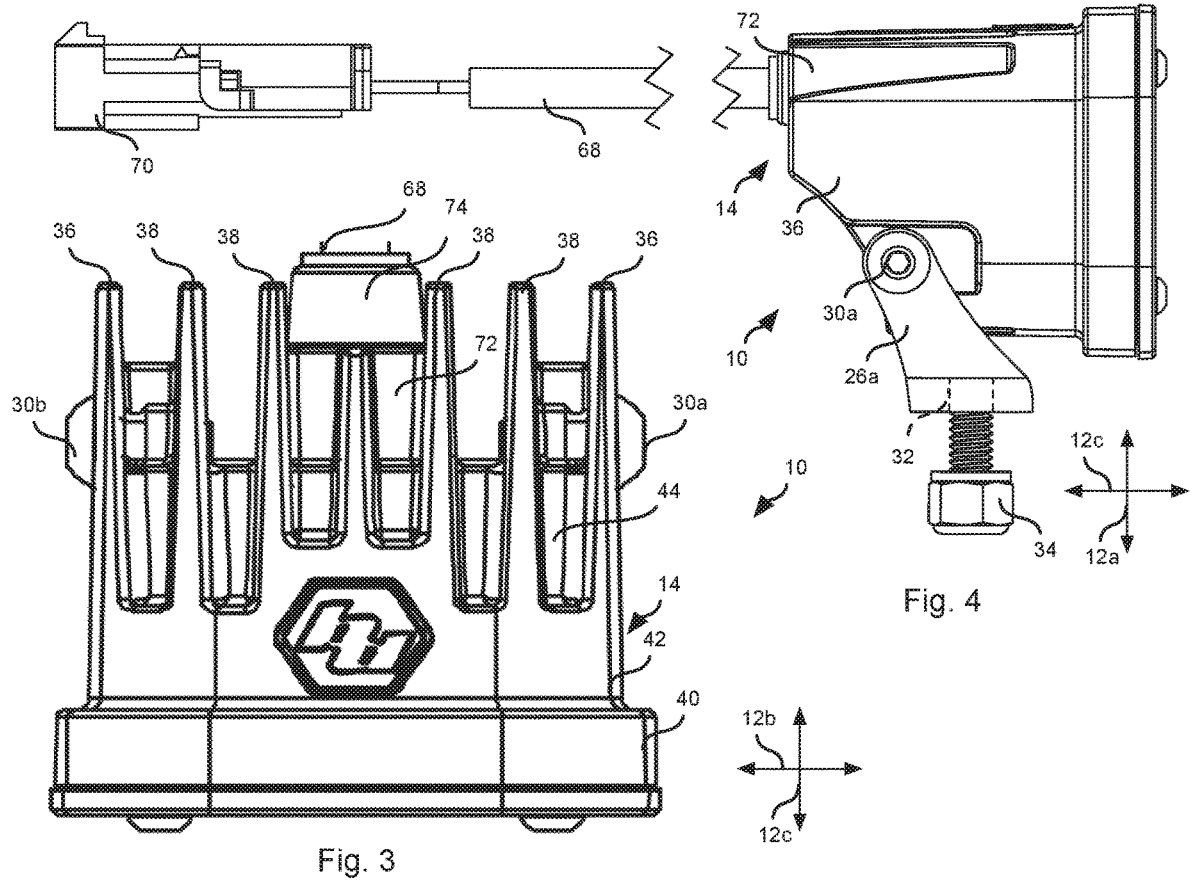

AUXILIARY LIGHT FOR MOUNTING TO A VEHICLE

FIELD OF THE INVENTION

This application relates to auxiliary lights for securing to a vehicle.

BACKGROUND OF THE INVENTION

In many off-road and recreational vehicular activities, it is desirable to provide additional lighting. For example, an additional lighting apparatus may be used to project light forward or around vehicles such as motorcycles, boats, utility vehicles, aircraft, construction and other equipment to increase operator visibility.

Adding additional light sources to achieve a desired short or long-distance illumination would in many applications exceed the space available or power capacity of the vehicle or equipment's capabilities. Recent developments in lighting sources including Light Emitting Diodes ("LED") and laser/phosphorus or gallium white light emitters, which permit greatly improved directional and surrounding illumination given the same amount of available space and electrical power without extensive or expensive modifications to the vehicle or its electrical systems.

In view of the foregoing, it would be an improvement in the art to improve the function and utility of auxiliary lighting for a vehicle.

SUMMARY OF THE INVENTION

In some embodiments, an apparatus includes an auxiliary light includes a housing defining a front opening extending in a horizontal direction and a vertical direction perpendicular to the horizontal direction. A light emitting device is mounted in the housing and a transparent cover is mounted over the front opening. A plurality of fins are mounted to the housing and extend rearwardly from the front opening along a longitudinal direction perpendicular to the horizontal direction and the vertical direction, the plurality of fins being thinner in a horizontal plane parallel to the horizontal direction and the longitudinal direction that in a vertical plane parallel to the horizontal direction and the vertical direction. The heights of the plurality of fins in the vertical direction decreases with distance from the front opening along the horizontal direction.

In some embodiments, bottom edges of the plurality of fins are angled in the horizontal plane. In some embodiments, bottom edges of the plurality of fins define concave arcs in a longitudinal plane parallel to the longitudinal and vertical directions. In some embodiments, the concave arcs of the plurality of fins are completely rearward from the housing along the longitudinal direction.

In some embodiments, the apparatus further includes a mount including a right arm pivotally mounted to a right side of the housing and a left arm mounted to a left side of the housing, the right arm and left arms having rear edges that are arcuate in shape in the vertical plane. In some embodiments, a radius of curvature of the rear edges of the right arm and the left arm is substantially equal to a radius of curvature of the plurality of fins.

In some embodiments, a height of the housing narrows in the vertical plane with distance from the front opening, the heights of the plurality of fins decrease less with distance from the front opening than the height of the housing. For example, the housing has a plurality of steps extending rearwardly from the front opening that narrow in height and width with distance from the front opening.

In some embodiments, outermost fins of the plurality of fins along the horizontal direction decrease in height with distance from the front opening to a greater extent than innermost fins of the plurality of fins. In some embodiments, upper edges of the outermost fins are sloped downward.

In some embodiments, the apparatus includes a mount having a right arm pivotally mounted to a right pivot on a right side of the housing and a left arm mounted to a left pivot on a left side of the housing. A base extends between the left arm and the right arm along the horizontal direction and a fastener engages the base. In some embodiments, the fastener is positioned between the right pivot and the front opening along the longitudinal direction and between the left pivot and the front opening along the longitudinal direction. In some embodiments, the fastener overlaps a position of a center of gravity of the auxiliary light along the longitudinal direction. In some embodiments, the left pivot is formed on a left flange extending rearwardly from a rear surface of the housing and the right pivot is formed on a right flange extending rearwardly from the rear surface. In some embodiments, portions of bottom edges of the plurality of fins extending rearwardly from the left pivot and the right pivot have an arcuate shape.

In some embodiments a power chord exits the housing opposite the front opening and extending through at least one fin of the plurality of fins. In some embodiments, a perimeter of the housing around the front opening is rounded and includes no straight portions in the vertical plane. In some embodiments, the auxiliary light includes a bezel secured to the front opening, the bezel removably securing the transparent cover to the housing.

BRIEF DESCRIPTION OF THE DRAWINGS

Preferred and alternative examples of the present invention are described in detail below with reference to the following drawings:

FIG. 3 is a top view of the auxiliary light of FIG. 1;

FIG. 4 is a side view of the auxiliary light of FIG. 1;

DETAILED DESCRIPTION OF THE PREFERRED EMBODIMENT

Figure 1:
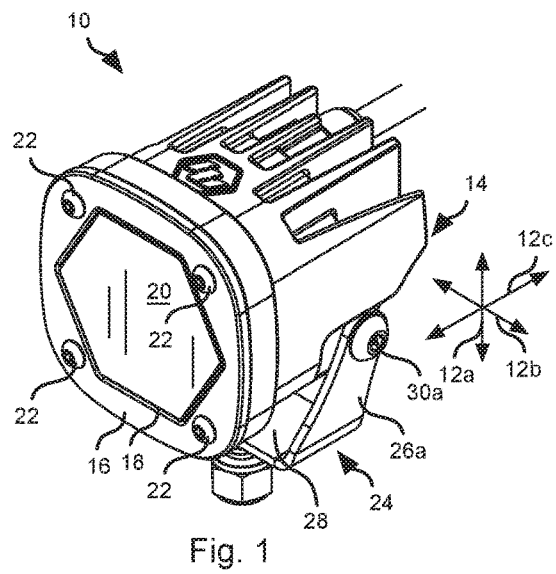
FIG. 1 is an isometric view of an auxiliary light in accordance with an embodiment of the present invention.
Figure 2:
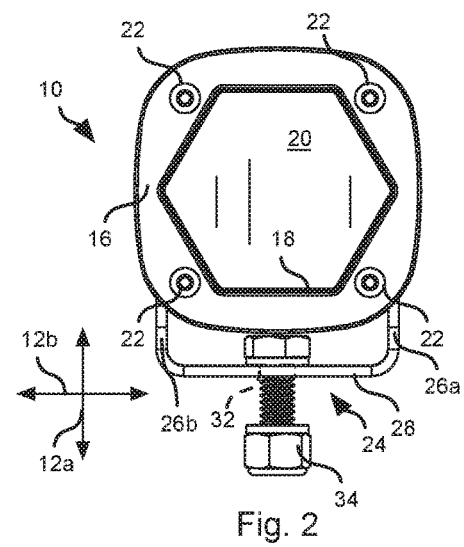
FIG. 2 is a front view of the auxiliary light of FIG. 1.

Referring to FIGS. 1 and 2, an auxiliary light 10 as described herein may be understood with respect to a vertical direction 12a, a horizontal direction 12b and a longitudinal direction 12c that are all mutually perpendicular. These directions are defined to enable an understanding of the relative orientation and position of portions of the invention but need not correspond to global vertical, horizontal, and longitudinal directions when in use.

An auxiliary light 10 may be used in various applications such as secured to a vehicle such as a four-wheeled road or off-road vehicle, bicycle, motorcycle, boat, or any other type of vehicle. The light may also be secured to other articles, such as a helmet of a driver of a vehicle. The auxiliary light 10 may also be secured to a fixed structure rather than a vehicle.

The light 10 includes a housing 14 covered at its front by a front bezel 16 defining an opening 18. The opening 18 may be covered by a transparent layer 20 that may be transparent plastic or glass. The transparent layer 20 may also function as a lens to focus or diffuse light. The transparent layer may be textured or contoured in order to diffuse light passing therethrough. In the illustrated embodiment, the transparent layer 20 is substantially (e.g., within 5 degrees of) parallel to a vertical-horizontal plane parallel to the vertical direction 12a and horizontal direction 12b. A front surface of the bezel 16 and the front of the housing 14 that engages the bezel 16 may also be substantially parallel to the vertical-horizontal plane.

In the illustrated embodiment, the bezel 16 secures to the front of the housing 14 having the transparent layer 20 captured between itself and the perimeter of the front of the housing thereby securing the transparent layer 20 to the housing 14. For example, fasteners such as screws 22 may pass through the bezel 16, or both the bezel 16 and the transparent layer, and engage corresponding threaded openings defined by the housing 14. The screws 22 may be any type of screw known in the art and may preferably have rounded heads to avoid catching on anything or accumulating debris.

The light 10 may be secured to a vehicle or other structure by means of a mount 24. The mount 24 may be embodied as a bracket including a left arm 26a, a right arm 26b and a cross piece 28 extending between the arms 26a, 26b. The arms 26a, 26b and cross piece 28 may be a single member having end portions bent upward relative to the cross piece 28 to form the arms 26a, 26b. The arms 26a, 26b may be bent such that they are substantially perpendicular to the cross piece 28.

The left arm 26a may be attached to a left pivot 30a on a left side of the housing 14 and the right arm 26b may be attached to a right pivot 30b (shown in FIG. 4) on a right side of the housing 14. For example, the arms 26a, 26b may define apertures through which pivots 30a, 30b (e.g., bolts) pass and engage the housing 14.

The cross piece 28 may receive a fastener 34 for securing the cross piece 28 to a vehicle or other structure. In some embodiments, the fastener 34, i.e. an aperture 32 in the cross piece 28 that receives it, may be centered along the horizontal direction 12b between the arms 26a, 26b. The fastener 34 and aperture that receives it may also be substantially collocated with a center of gravity of the light 10, e.g., offset from the location of the center of gravity by no more than 5%, preferably less than 2%, of the length of the light 10 in the longitudinal direction 12c when the bezel 16 is parallel to the vertical-horizontal plane.

Figure 5:
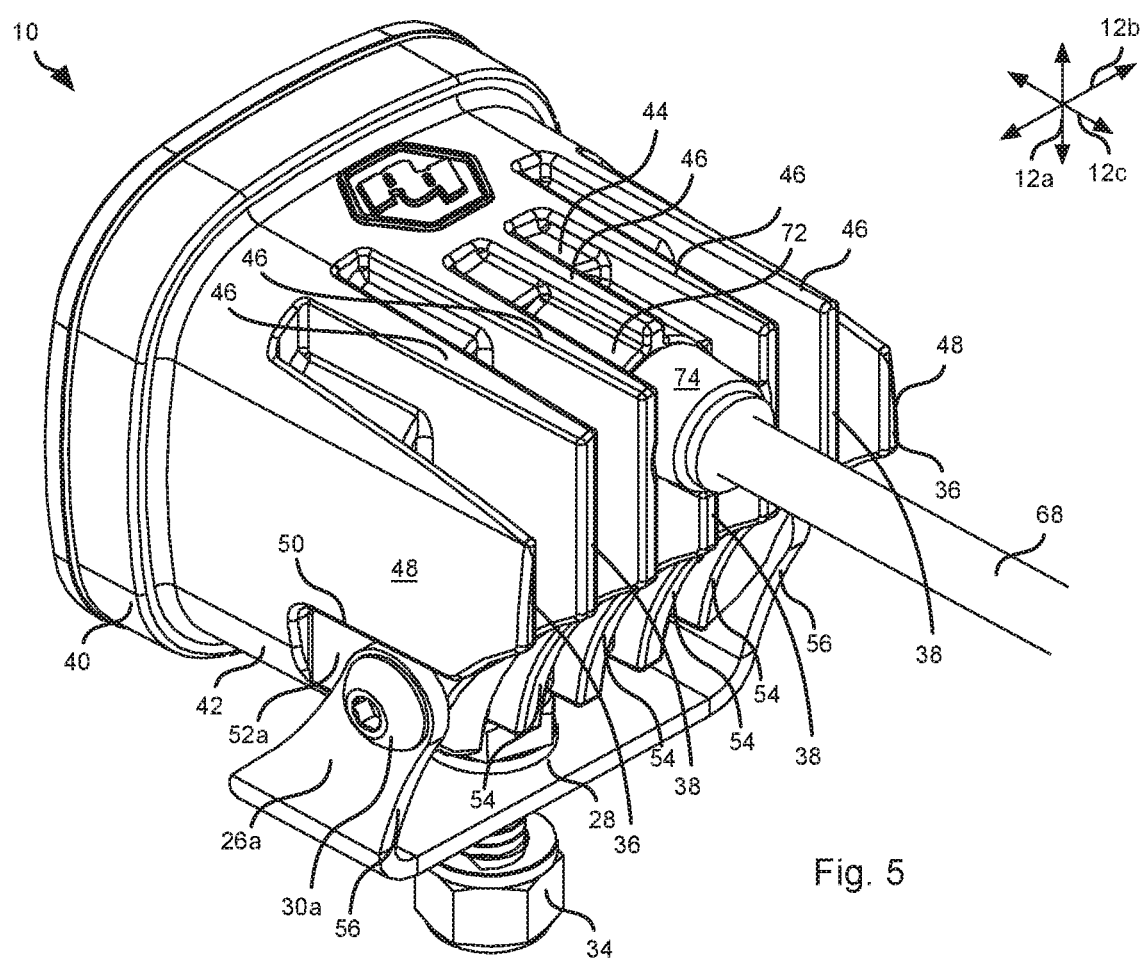
FIG. 5 is a rear isometric view of the auxiliary light of FIG. 1.

Referring to FIGS. 3, 4 and 5, the housing 14 may be provided with fins to facilitate cooling. In particular there may be outer fins 36 on the left and right sides and inner fins 38 positioned between the outer fins. The outer fins 36 may be shorter along the vertical direction 12a then the inner fins 38 thereby improving airflow over the inner fins 38. For example, the outer fins 38 may slope downwardly with distance from the middle section 42 to a greater extent than the inner fins 38. The fins 36, 38 may be much thinner along the horizontal direction 12b than their height along the vertical direction 12a.

As is apparent in FIGURES, lateral surfaces of the outer fins 36 and top and bottom surfaces of the inner fins 38 are continuations of a surface of the housing 14 from which they emanate. For example, the bezel 16 may be a "rounded rectangle," which may be defined as a rectangle or square having its sides bowed outwardly and its corners rounded. The housing may include, starting from the bezel 16 and moving rearwardly along the longitudinal direction 12c, a front section 40, middle section 42, and rear section 44. Each of these sections 40-44 may have the same rounded rectangle shape. In the illustrated embodiment, moving rearwardly from the bezel 16, each section has a cross section in the vertical-horizontal plane that is a scaled down version of the cross section of the section preceding it. As shown in FIGURES, there may be a gradual transition (chamfer or bevel) between each section 40-44 and an adjacent section 40-44.

In the illustrated embodiments, the upper surfaces and lower surfaces of the inner fins 46 and lateral surfaces of the inner fins may be continuations of the rounded rectangular cross section of the middle section 42. In some embodiments, the rounded rectangle shape of the middle section 40 is tapered, i.e. is scaled down with distance from the front section 40. The surfaces of the fins 36, 38 that are continuations o the middle section 40 may continue this taper.

In the horizontal-longitudinal plane parallel to the horizontal direction 12b and longitudinal direction 12c, the thickness of the fins 36, 38 narrows with distance from the middle section 42 along the longitudinal direction 12c. As is apparent in FIG. 5, there may be curved transitions between the upper and lower surfaces of the inner fins 38 and the vertical surfaces of the fins 38. Likewise, there may be a curved transition between outer surfaces of the outer fins 36 that are continuations of the middle section 42 and inward facing surfaces of the outer fins 36. Rear facing edges of the fins 36, 38 may also be rounded, chamfered, or otherwise smoothed.

Referring specifically to FIG. 5, various features may be formed in the fins 36, 38 to facilitate functionality of the light 10. For example, a lower-rear portion of the outer fins 36 may define cutouts 50 to provide clearance for the pivots 30a, 30b. In the illustrated embodiment, flanges 52a, 52b project rearwardly along the longitudinal direction 12c from the rear surface of rear section 44 and into the cutouts 50. The flanges 52a, 52b may then define apertures for receiving the pivots 30a, 30b. The cutouts 50 may enable the light 10 to rotate about the pivots 30a, 30b with some range of motion, e.g., 120 to 180 degrees, without interfering with the arms 26a, 26b.

In some embodiments, rearmost portions of the bottom edges of the fins 36, 38 may arc upwardly, i.e. the fins 36, 38 may define a concave arcuate edge 54 extending from the bottom edges to the rear edges of the fins 36, 38, where concave indicates bowing inward. The concave arcuate edge 54 may provide clearance for the cross piece 28 of the mount 24 when the light 10 is pivoted with the transparent cover 20 facing substantially upwardly along the vertical direction 12c. In the illustrated embodiment, the arcuate edges 54 are positioned completely rearward from the rear section 44 of the housing 14 along the longitudinal direction 12c.

In some embodiments, rear edges 56 of the arms 26a, 26b may also have a concave arcuate shape. In some embodiments, the radius of curvature of the rear edges 56 is substantially equal to (e.g., within +/−5% of) the radius of curvature of the concave arcuate edges 54. In some embodiments, the arcuate edges 54, 56 may define other concave shapes, such as a series of two or more facets that bow inward.

As apparent particularly in FIG. 4, the center of the fastener 34 and/or the opening 32 in the cross piece 28 that receives the fastener 34 and the center of the pivots 30a, 30b may be offset from one another along the longitudinal direction 12c. For example, this offset may be between 15 and 30 percent of the length of the light 10 in the longitudinal direction 12c when the bezel 16 is parallel to the vertical-horizontal plane. This offset may facilitate rotation of the light 10 without interference with the cross piece 28 of the mount 24.

Figure 6:
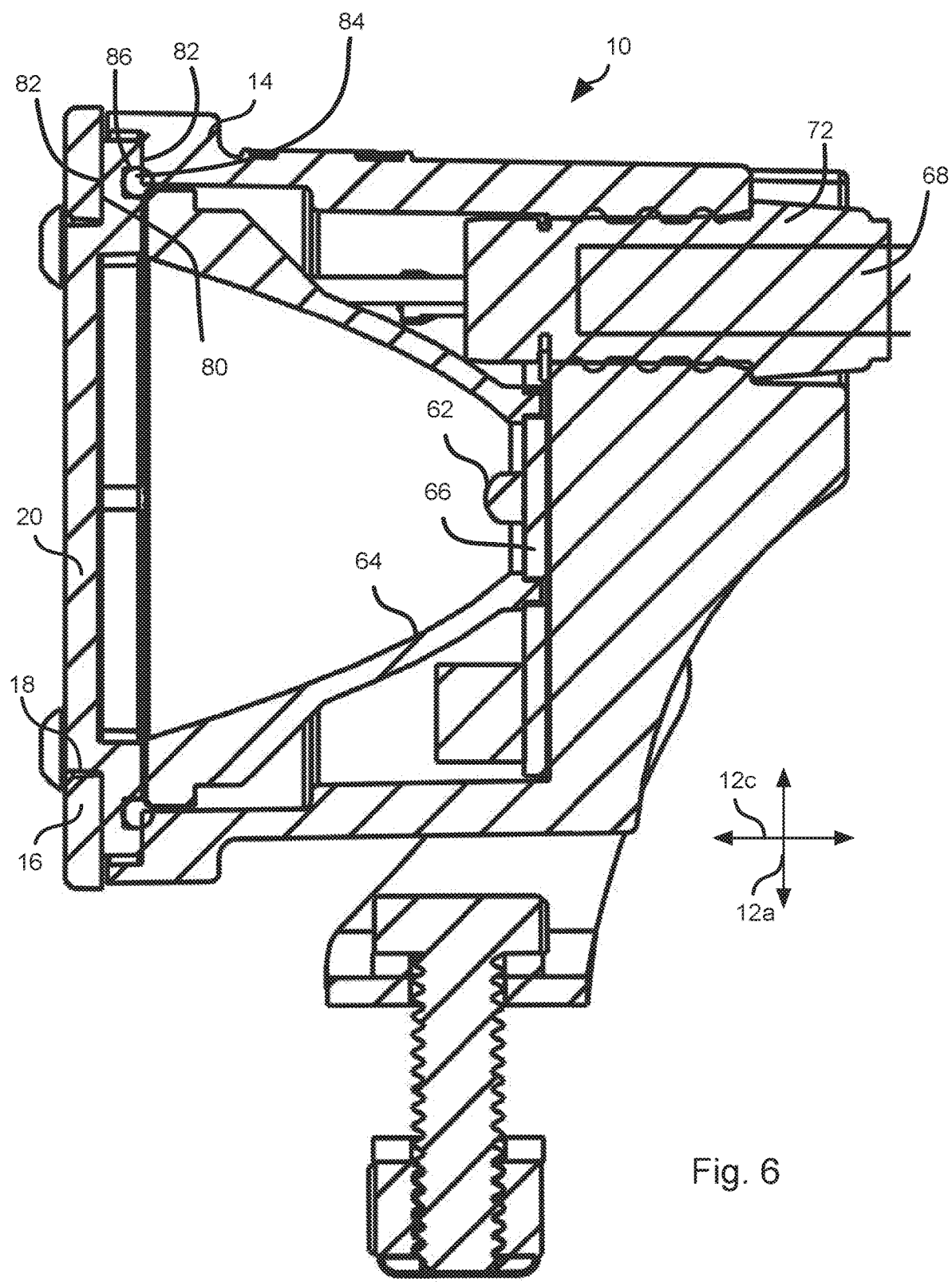
FIG. 6 is side cross-sectional view showing a configuration of a lens and bezel in accordance with an embodiment of the present invention.

Referring to FIG. 6, while still referring to FIGS. 3, 4 and 5, the housing 14 may contain various components for implementing the light 10. For example, a reflector 64 having a parabolic or other shape may secure to the front of the housing 14 adjacent the transparent cover 20. A light 62 may be mounted such that it emits light through the transparent cover 20 and onto the reflector 64. The light 62 may include one or more a Light Emitting Diodes ("LED"), laser/phosphorus or gallium white light emitter, or other type of light source. The housing 14 may further contain a drive circuit 66 configured to supply power to the light 62. The driver circuit 66 may be coupled to a power cable 68 entering the housing 14, such as through the rear surface of the rear section 44. The cable 68 may have at its other end a plug 70 for engaging a socket defined by the electrical system of a vehicle to which the light 10 is mounted or to some other source of electrical power. In some embodiments, turning the light 10 on and off may be controlled by controlling supply of power through the cable 68 such that switches are not provided on the light 10 itself. In other embodiments, a switch for turning the light 10 on and off may be provided on the housing 14.

As is visible in FIGS. 3, 5 and 6, a sleeve 72 may protrude from the rear surface of the rear section 44 of the housing 14. The sleeve 72 may be integrally formed with the rear section 44 and fins 38. For example, as shown in FIG. 5, the sleeve 72 may extend through one of the inner fins 38, such as the center fin 38, such that portions of the fin 38 protrude above and below the sleeve 72 in the vertical direction 12a. As shown in FIG. 5, fins 38 on either side of the center fin may include cutout portions to provide clearance for the cable 68, such as for a flexible sleeve 74 surrounding the cable 68 and extending into the sleeve 72.

Referring specifically to FIG. 6, in some embodiments, the transparent layer 20 may include a circumferential recess 80 extending around its perimeter, such as a recess 80 formed by machining away a portion of the perimeter of the transparent layer 20. The housing 14 may define a corresponding recess 82 that receives the portion of the perimeter of the transparent layer 20. The depths of the recesses 80 be such that when the bezel 16 is placed in the recess 80, the portion of the transparent layer 20 surrounded by the recess 80 protrudes through the opening 18 in the bezel 16 and is substantially flush with the front surface of the bezel 16, e.g., within 1 mm, preferably within 0.2 mm, of flush. In this manner, the gathering of debris in any protruding or recessed surfaces on the face of the light 10 is reduced.

In order to keep contaminants out of the housing 14, an O-ring 84 may be captured between the housing 14 and the transparent layer 20. In the illustrated embodiment, the O-ring seats within a groove 86 formed in the transparent layer opposite the recess 80. As is apparent in FIG. 6, the O-ring protrudes from the groove 86 and engages the housing 14, such as a forward facing wall of the recess 82 defined by the housing 14.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. An apparatus comprising:
 an auxiliary light including:
  a housing defining a front opening extending in a horizontal direction and a vertical direction perpendicular to the horizontal direction;
  a light emitting device mounted in the housing;
  a transparent cover mounted over the front opening; and
  a plurality of fins mounted to the housing and extending rearwardly from the front opening along a longitudinal direction perpendicular to the horizontal direction and the vertical direction, the plurality of fins being thinner in a horizontal plane parallel to the horizontal direction and the longitudinal direction than in a vertical plane parallel to the horizontal direction and the vertical direction;
  wherein heights of the plurality of fins in the vertical direction decreases with distance from the front opening along the horizontal direction.

2. The apparatus of claim 1, wherein bottom edges of the plurality of fins are angled in the horizontal plane.

3. The apparatus of claim 1, wherein bottom edges of the plurality of fins define concave arcs in a longitudinal plane parallel to the vertical direction and the longitudinal direction.

4. The apparatus of claim 3, wherein the concave arcs of the plurality of fins are completely rearward from the housing along the longitudinal direction.

5. The apparatus of claim 4, further comprising a mount including a right arm pivotally mounted to a right side of the housing and a left arm mounted to a left side of the housing, the right arm and left arms having rear edges that are arcuate in shape in the vertical plane.

6. The apparatus of claim 5, wherein a radius of curvature of the rear edges of the right arm and the left arm is substantially equal to a radius of curvature of the plurality of fins.

7. The apparatus of claim 1, wherein a height of the housing narrows in the vertical plane with distance from the front opening, the heights of the plurality of fins decrease less with distance from the front opening than the height of the housing.

8. The apparatus of claim 7, wherein the housing has a plurality of steps extending rearwardly from the front opening.

9. The apparatus of claim 1, wherein outermost fins of the plurality of fins along the horizontal direction decrease in height with distance from the front opening to a greater extent than innermost fins of the plurality of fins.

10. The apparatus of claim 9, wherein upper edges of the outermost fins are sloped downward.

11. The apparatus of claim 1, further comprising a mount including:
 a right arm pivotally mounted to a right pivot on a right side of the housing;
 a left arm mounted to a left pivot on a left side of the housing;
 a base extending between the left arm and the right arm along the horizontal direction;

a fastener engaging the base;
wherein the fastener is positioned between the right pivot and the front opening along the longitudinal direction and between the left pivot and the front opening along the longitudinal direction.

12. The apparatus of claim 11, wherein the fastener overlaps a position of a center of gravity of the auxiliary light along the longitudinal direction.

13. The apparatus of claim 11, wherein the left pivot is formed on a left flange extending rearwardly from a rear surface of the housing and the right pivot is formed on a right flange extending rearwardly from the rear surface.

14. The apparatus of claim 11, wherein portions of bottom edges of the plurality of fins extending rearwardly from the left pivot and the right pivot have an arcuate shape.

15. The apparatus of claim 1, further comprising a power chord exiting the housing opposite the front opening and extending through at least one fin of the plurality of fins.

16. The apparatus of claim 1, wherein a perimeter of the housing around the front opening is rounded and includes no straight portions in the vertical plane.

17. The apparatus of claim 1, wherein the auxiliary light includes a bezel secured to the front opening, the bezel removably securing the transparent cover to the housing.

* * * * *